United States Patent [19]

Duttlinger

[11] 4,274,899

[45] Jun. 23, 1981

[54] METHOD OF MANUFACTURING A TUBULAR TIRE FOR CYCLES

[75] Inventor: Jean-Christian Duttlinger, Soissons, France

[73] Assignee: Wolber, Soissons, France

[21] Appl. No.: 94,314

[22] Filed: Nov. 14, 1979

Related U.S. Application Data

[60] Division of Ser. No. 935,316, Aug. 21, 1978, which is a continuation-in-part of Ser. No. 780,998, Mar. 24, 1977, abandoned.

[30] Foreign Application Priority Data

Apr. 8, 1976 [FR] France .................................. 76 10229

[51] Int. Cl.³ ............................................. B29H 17/14
[52] U.S. Cl. ............................... 156/123 R; 152/350; 152/354 R; 152/DIG. 16; 156/133
[58] Field of Search .................... 156/110 R, 118, 120, 156/121, 122, 123 R, 133; 152/349, 350, 354, 374, DIG. 16

[56] References Cited

U.S. PATENT DOCUMENTS

| | | | |
|---|---|---|---|
| 494,003 | 3/1893 | Irons | 156/118 |
| 548,673 | 10/1895 | Straus | 156/122 |
| 605,644 | 6/1898 | Morgan | 152/350 |
| 646,710 | 4/1900 | Seiberling | 152/350 |
| 651,745 | 6/1900 | Caldwell | 156/110 R |
| 1,463,742 | 7/1923 | Lane | 152/350 |
| 1,474,085 | 11/1923 | Meredith | 152/350 |
| 1,683,669 | 9/1928 | Henderson | 156/118 |
| 1,913,422 | 6/1933 | Wikle | 156/121 |
| 2,430,076 | 11/1947 | Pollock | 156/122 |
| 4,057,445 | 11/1977 | Brinkley | 156/121 |

FOREIGN PATENT DOCUMENTS 731436 4/1966 Canada ..................................... 156/121

Primary Examiner—John E. Kittle
Attorney, Agent, or Firm—Wenderoth, Lind & Ponack

[57] ABSTRACT

A non-vulcanized tire body in the form of an endless band has opposite edges, an inner surface, and an outer surface having a tread. Either a completely enclosed toroidal shaped inner tube formed of non-vulcanized material or a layer of non-vulcanized material having a high impermeability to air is positioned on the inner surface of the tire body. The tire body is then wrapped around the inner tube, and the opposite edges of the tire body are joined to form a completely enclosed tire. The edges may be abutted or overlapped. Thereafter, the tire is vulcanized to form a completely and irremovably enclosed tubular tire.

10 Claims, 9 Drawing Figures

METHOD OF MANUFACTURING A TUBULAR TIRE FOR CYCLES

This is a division of application Ser. No. 935,316, filed Aug. 21, 1978, which is a continuation-in-part of application Ser. No. 780,998, filed Mar. 24, 1977, now abandoned.

BACKGROUND OF THE INVENTION

The present invention relates to an improved method for manufacturing wholly enclosed tubular tires for cycles.

As employed herein the term "tubular tire" refers to a pneumatic tire, either of the inner tube or tubeless type, wherein the tire body is wholly and irremovably enclosed, in contrast to a common separable type tire, such as employed in automobiles, wherein upon removing the tire from the wheel rim, the interior of the tire is exposed.

Tubular tires are conventionally used in cycles, and particularly in racing cycles, since a tubular tire need not include the conventional heavy steel cords along the edges which must closely and sealingly mate with the wheel rim. Such cords of course add weight to the tire, and this is disadvantageous in tires used for certain purposes, for example on racing bicycles.

Tubular tires are conventionally manufactured by providing an open tire body, forming hems on opposite edges of the tire body, and then enclosing the tire body by sewing the abutted hems of the opposite edges of the tire body. This conventional method of manufacture is however expensive and is difficult to adapt to mass production techniques.

SUMMARY OF THE INVENTION

With the above discussion in mind, it is the object of the present invention to provide an improved method of forming wholly enclosed tubular tires for cycles, both of the inner tube type and of the tubeless type.

It is a further object of the present invention to provide such a method which overcomes the disadvantages of prior art methods.

It is a still further object of the present invention to provide such an improved method which may be readily adapted to mass production techniques and which thereby reduces the overall cost of the finished products.

These objects are achieved in accordance with one embodiment of the present invention by providing a non-vulcanized tire body in the form of an endless band having opposite edges, an inner surface, and an outer surface having thereon a tread. A completely enclosed toroidal shaped inner tube formed of non-vulcanized material is positioned on the inner surface of the tire body. The tire body is wrapped about the inner tube, and the opposite edges of the tire body are overlapped over the inner tube, to thereby enclose the inner tube within the tire body. The overlapped edges are joined to form a tire having irremovably enclosed therein the inner tube. Thereafter, the tire, including the tire body, tread and inner tube are vulcanized.

The overlapped edges may be joined by any suitable and known adhesive.

Furthermore, prior to the step of vulcanizing, a protective tape may be applied over the overlapped edges.

The materials of the tire body, the tread, and the inner tube may be any materials which are conventionally employed for such articles.

In accordance with a preferred further specific feature of this embodiment of the present invention, the tire body may be positioned on a cylindrical drum with the inner surface of the tire body positioned radially outwardly. The inner tube is then positioned around the tire body and the cylindrical drum, whereafter the tire body is wrapped around the inner tube and the opposite edges are overlapped and joined, whereby the overlapped edges will be formed at the outer circumference of the tire and the tread will be positioned at the inner circumference of the tire. Thereafter, the tire is twisted or turned inside out such that the overlapped edges are positioned at the inner circumference of the tire and such that the tread is positioned at the outer circumference of the tire. Thereafter, the vulcanizing step may be carried out.

In accordance with a further embodiment of the present invention, specifically for the manufacture of a wholly enclosed tubular tubeless tire for cycles, there is provided a non-vulcanized tire body in the form of an endless band having opposite edges, an inner surface, and an outer surface having thereon a tread. A layer of non-vulcanized material having a high impermeability to air is deposited or positioned on the inner surface of the tire body. The tire body is then folded and the opposite edges of the tire body are joined to thereby form the tire body into a completely enclosed tubeless tire. Thereafter, the tire is vulcanized.

The layer of material having a high impermeability to air may be any material known in the art which would ensure that the tire be rendered impermeable to air so that a tubeless tire is formed. The material may be a material having a natural or a synthetic rubber base, or a mixture of these materials or of any other suitable substance of a composition and in quantities which would ensure that the tire be rendered impermeable to air. When the inner surface of the tire body is coated with such material, then the material may be in the form of a solution or latex. When the substance is deposited in the tire body when the tire body is being formed, the material may be in the form of a solution or a latex or a calendered sheet.

It is to be understood that the tire body may be formed of any materials which are conventional in the art.

In accordance with a more specific and further preferred form of this embodiment of the invention, the tire body is positioned on a cylindrical drum with the inner surface of the tire body positioned radially outwardly. The layer of non-vulcanized material having a high impermeability to air may then be deposited in any suitable manner on the inner surface of the tire body, to completely cover such inner surface. The tire body is then folded and the opposite edges of the tire body are joined such that the joined edges are formed at the outer circumference of the tire and the tread is positioned at the inner circumference of the tire. Thereafter, the tire is twisted or turned inside out such that the joined edges are positioned at the inner circumference of the tire and the tread is positioned at the outer circumference of the tire. Thereafter, the vulcanizing step is carried out.

In further accordance with this embodiment of the invention, prior to the step of vulcanizing, a protective tape may be applied over the joined edges.

The opposite edges of the tire body may be overlapped and joined. Alternatively, the opposite edges may be abutted, and the edges may be joined by applying a tape of air impermeable material to the inner surface of the layer of material having a high impermeability to air at a position to span the abutted edges. In this arrangement of the invention, an outer tape formed of a wear resistant fabric material having high breaking strength weft threads may be applied over the abutted edges exterior thereof.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
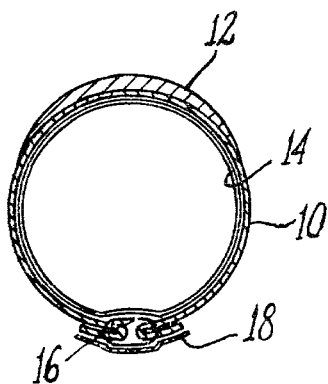
FIG. 1 is a transverse section through a conventional tubular tire.

A conventional tubular tire is shown in FIG. 1 and includes a tire body 10 having a tread 12 thereon and an inner tube 14. Opposite edges of the tire body 10 have hems formed therein, and the hems are abutted and sewn together to form a seam 16. The seam is then exteriorly covered by a tape 18.

The present invention however provides a method for manufacturing a tubular tire which may be carried out in a much less expensive manner than the manufacture of the tire shown in FIG. 1.

With reference now to FIGS. 2 and 5 through 9 of the drawings, a first embodiment of the present invention will be described.

The tubular tire also includes a tire body 20 having an outer surface to which is attached a tread 12, an inner surface and opposite edges 24 and 26. A completely enclosed toroidal shaped inner tube 22 formed of non-vulcanized material is positioned adjacent the inner surface of the tire body 20. The tire body is then wrapped around the inner tube 22, and opposite edges 24 and 26 of tire body 20 are overlapped over the inner tube to thereby enclose the inner tube within the tire body. The overlapped edges 24 and 26 are then joined, for example by an adhesive, to form a tire having irremovably enclosed therein inner tube 22. Thereafter, the entire tire, including tread 12, tire body 20 and inner tube 22 are vulcanized.

Additionally, a protective tape 28 may be applied over the overlapped edges 24 and 26 prior to the step of vulcanizing. It is believed that those skilled in the art will readily understand what materials may be employed as the protective tape.

Figure 2:
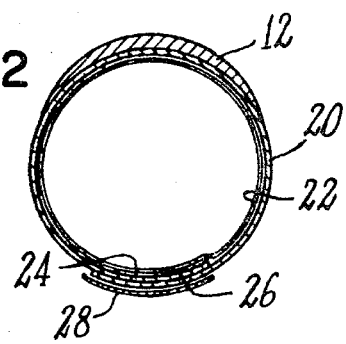
FIG. 2 is a transverse section through a tubular tire manufactured in accordance with a first embodiment of the present invention.
Figure 5:
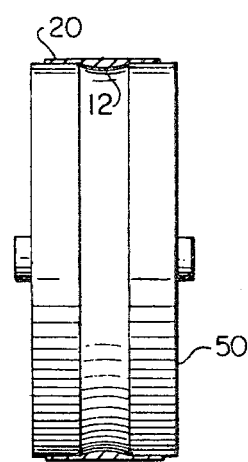
FIGS. 5 through 9 are partially schematic and sectional views illustrating a portion of the sequence of operations in the manufacture of the tubular tire shown in FIG. 2.
Figure 6:
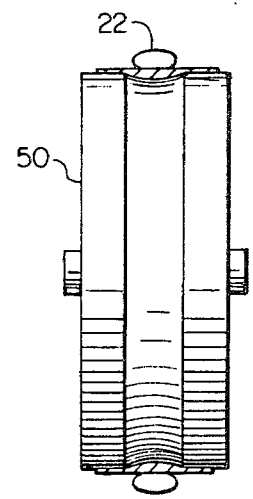
Figure 7:
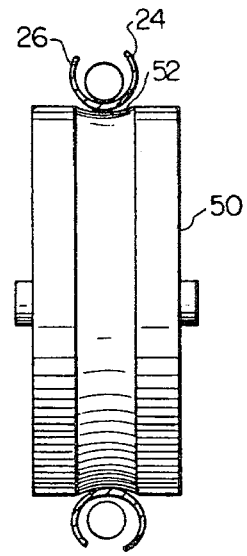
Figure 8:
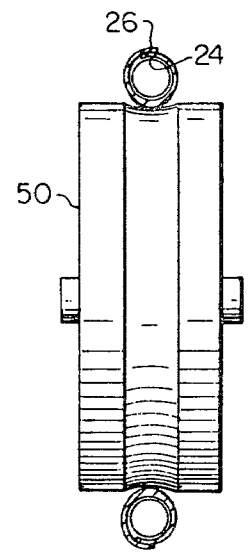
Figure 9:
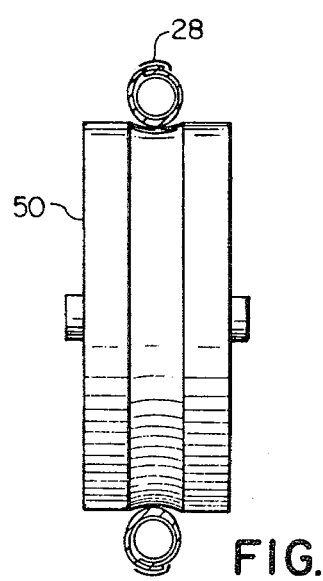

A specific preferred arrangement for assembling the tubular tire of FIG. 2 is shown in FIGS. 5 through 9. Specifically, a cylindrical drum 50 may be provided on the outer circumference therein with a peripheral recess 52 substantially adapted to conform to the shape of and accommodate tread 12 of tire body 20. The tire body 20 is then fitted around the cylindrical drum 50 with tread 12 positioned in recess 52 and with the inner surface of the tire body positioned radially outwardly, as shown in FIG. 5. Then, inner tube 22 is positioned around the tire body 20 and the cylindrical drum 50, as shown in FIG. 6. Then, the opposite edges 24 and 26 are folded around the inner tube as shown in FIG. 7. The opposite edges 24 and 26 are then overlapped and joined, as shown in FIG. 8. Protective tape 28 may be added, as shown in FIG. 9. It will be apparent from the illustrations of FIGS. 5 through 9 that by the above described sequence of operations the overlapped edges will be positioned at the outer circumference of the tire, and the tread 12 will be positioned at the inner circumference of the tire. Therefore, the tire is twisted or turned inside out such that the overlapped edges are positioned at the inner circumference of the tire and such that the tread 12 is positioned at the outer circumference of the tire, i.e. the relative positions necessary for final utilization of the tire. Thereafter, the vulcanizing step is carried out to provide the finished tire.

Figure 3:
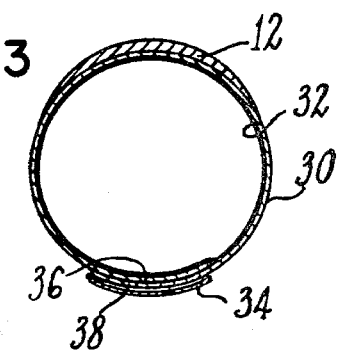
FIGS. 3 and 4 are transverse sections through tubular tires manufactured in accordance with further embodiments of the present invention.
Figure 4:
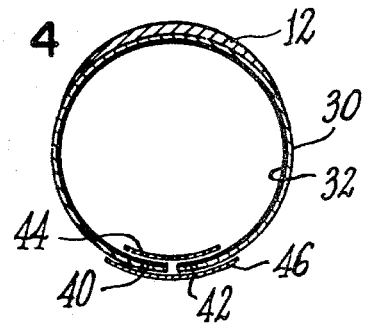

In accordance with further embodiments of the present invention, as illustrated in FIGS. 3 and 4 of the drawings, it is possible to manufacture a tubeless wholly enclosed tubular tire.

Specifically, in this embodiment of the invention, the inner tube 22 is dispensed with. The tire body 30 has an outer surface to which is applied tread 12, an inner surface and opposite edges. To the inner surface of the tire body 30 is applied, either during the formation of the tire body or during the assembly of the tire, a layer 32 of non-vulcanized material having a high impermeability to air. Thereafter, the tire body 30 is folded and the opposite edges thereof are joined to form a completely enclosed tubeless tire.

In accordance with the embodiment of FIG. 3, the opposite edges 36 and 38 of the tire body 30 may be overlapped, and a protective tape 34 may be applied outwardly over the overlapped edges.

However, alternatively, the opposite edges 40 and 42 of the tire body 30 may be abutted, as shown in FIG. 4. The abutted edges 40 and 42 are joined by applying a tape 44 of air impermeable material on the inner side of the layer 32 at a position spanning the abutted edges 40 and 42. Additionally, an outer tape 46 may be applied over the abutted edges 40 and 42. Outer tape 46 is preferably formed of a wear resistant fabric material having high breaking strength weft threads.

It is believed to be apparent that the tubular tires shown in FIGS. 3 and 4 may be assembled in substantially the same manner described above with regard to FIGS. 5 through 9 of the drawings, with the exception that in place of the step illustrated in FIG. 6, the layer 32 of material which has a high impermeability to air may be applied to the inner surface of the tire body. Alternatively, as mentioned above, the step illustrated in FIG. 6 may be entirely eliminated, if the layer 32 has been applied to the tire body during the manufacture and formation thereof.

It is believed that one of ordinary skill in the art will readily understand how to manufacture tubular tires in accordance with the present invention in view of the above description. Therefore, various other specific features which in and of themselves do not form the present invention will not be described in detail. It is generally to be understood however that the degree of overlapping of the opposite edges 24 and 26 or 36 and 38 may be approximately two centimeters. However, this dimension is in no way intended to be limiting to the scope of the present invention.

Furthermore, the tire body may be formed from conventional tire material, such as textile material, for example cotton, or from synthetic fibers such as polyamide or polyester fibers, or a mixture of natural and synthetic fibers. The tire body may have any conventional structure, such as a "biased ply structure", a radial type structure, or a cross-biased ply structure.

The layer 32 can be deposited either by coating in the form of a solution or latex, or when the tire body is being formed in the form of a calendered sheet, a solution or a latex.

Furthermore, it is to be understood that the tire valve, not shown, may be secured in various ways. The valve may be of the type having a base made of natural or synthetic rubber, and may be fitted in joint covering strip 44. In the event that strip 44 is not provided, the valve may be secured by an adhesive to a pad formed of a high impermeability mixture, such pad (not shown) in turn being secured by adhesive to layer 32. The valve also may be of the type having a metal base which establishes a seal by a clamping action and which grips all or part of the interconnected layers of the rubber and fabric material forming the tire body 30.

In the event that a tire manufactured in accordance with the present invention is punctured, the tire can easily be repaired either by the aid of a mastic introduced through the puncture, or by using commercially available products sold in the form of aerosol canisters for simultaneously inflating a tire and sealing a puncture.

Although the present invention has been described and illustrated with regard to specific procedures, it is to be understood that various modifications may be made to these specifically described and illustrated procedures without departing from the scope of the present invention.

What I claim is:

1. A method of forming a wholly enclosed tubular tire for cycles, said method comprising:

providing a non-vulcanized tire body in the form of a unitary and single endless band having opposite edges, an inner surface, and an outer surface having thereon a tread;

positioning said tire body around a cylindrical drum with said inner surface positioned radially outwardly and with said outer surface contacting said drum;

positioning a completely enclosed toroidal shaped inner tube formed of non-vulcanized material around said body and said cylindrical drum with said inner tube positioned on said inner surface of said tire body;

wrapping said tire body about said inner tube, and overlapping said opposite edges of said tire body over said inner tube, to thereby enclose said inner tube within said tire body;

joining said overlapped edges to thereby form a cycle tire having irremovably enclosed therein said inner tube, such that said overlapped and joined edges are formed at the outer circumference of said tire and said tread is positioned at the inner circumference of said tire;

twisting said tire such that said overlapped edges are positioned at said inner circumference of said tire and said tread is positioned at said outer circumference of said tire; and thereafter vulcanizing said cycle tire.

2. A method as claimed in claim 1, further comprising applying protective tape over said overlapped edges prior to said step of vulcanizing.

3. A method of forming a wholly enclosed tubular tubeless tire for cycles, said method comprising:

providing a non-vulcanized tire body in the form of a unitary and single endless band having opposite edges, an inner surface, and an outer surface having thereon a tread;

coating on said inner surface of said tire body a solution of material to form a layer of non-vulcanized material having a high impermeability to air;

folding said tire body and joining said opposite edges of said tire body to thereby form said tire body into a completely enclosed tubeless tire; and thereafter vulcanizing said tire.

4. A method as claimed in claim 3, wherein said tire body is positioned on a cylindrical drum with said inner surface positioned radially outwardly, said tire body then being folded and said opposite edges being joined, such that said joined edges are formed at the outer circumference of said tire and said tread is positioned at the inner circumference of said tire, and further comprising twisting said tire such that said joined edges are positioned at said inner circumference of said tire and said tread is positioned at said outer circumference of said tire, whereafter said vulcanizing step is carried out.

5. A method as claimed in claim 3, further comprising, prior to said step of vulcanizing, applying protective tape over said joined edges.

6. A method as claimed in claim 3, wherein said material comprises latex.

7. A method as claimed in claim 3, wherein said material comprises a mixture having a rubber base.

8. A method as claimed in claim 3, wherein said opposite edges are overlapped and joined.

9. A method as claimed in claim 3, wherein said opposite edges are abutted, and said step of joining comprises applying a tape of air impermeable material to said layer inwardly thereof and at a position spanning said abutted edges.

10. A method as claimed in claim 9, further comprising applying an outer tape over said abutted edges, said outer tape being formed of a wear resistant fabric material having high breaking strength weft threads.

* * * * *